US007204229B2

(12) United States Patent
Ortiz

(10) Patent No.: US 7,204,229 B2
(45) Date of Patent: Apr. 17, 2007

(54) METHOD AND DEVICE FOR DETERMINING AN OUTPUT TORQUE

(75) Inventor: Igor Gómez Ortiz, Saragossa (ES)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/211,419

(22) Filed: Aug. 25, 2005

(65) Prior Publication Data

US 2006/0048749 A1 Mar. 9, 2006

(30) Foreign Application Priority Data

Aug. 27, 2004 (DE) ...................... 10 2004 041 660

(51) Int. Cl.
*F02D 41/00* (2006.01)
*G01L 3/26* (2006.01)

(52) U.S. Cl. ................ 123/339.14; 123/350; 123/339; 73/117.1

(58) Field of Classification Search ............. 123/339.1, 123/339.14, 350, 361, 396, 399, 403, 406, 123/415, 416, 421; 73/116, 117, 117.1, 117.2
See application file for complete search history.

(56) References Cited

U.S. PATENT DOCUMENTS

| | | | | |
|---|---|---|---|---|
| 4,126,200 | A * | 11/1978 | Miller et al. | 180/165 |
| 5,121,726 | A * | 6/1992 | Di Nunzio et al. | 123/339.11 |
| 5,619,967 | A | 4/1997 | Streib | 123/399 |
| 5,983,861 | A | 11/1999 | Nishio et al. | 123/399 |
| 6,488,605 | B2 * | 12/2002 | van Druten et al. | 475/207 |
| 6,578,546 | B2 * | 6/2003 | Schultalbers et al. | 123/300 |
| 6,909,959 | B2 * | 6/2005 | Hallowell | 701/88 |

FOREIGN PATENT DOCUMENTS

| | | |
|---|---|---|
| DE | 19501299 A1 | 7/1996 |
| DE | 19813717 C2 | 9/2003 |

* cited by examiner

*Primary Examiner*—John T. Kwon
(74) *Attorney, Agent, or Firm*—Baker Botts L.L.P.

(57) ABSTRACT

In a method for determining an output torque in order to prevent pedal play in a gas pedal assigned to a combustion engine, a correction torque $M_{uffset}$ is calculated in this respect, which is dependent on the activation speed $N_{act}$ of the idling regulator, the current speed, and the idling torque $M_{IS}$ calculated by the idling regulator.

18 Claims, 3 Drawing Sheets

METHOD AND DEVICE FOR DETERMINING AN OUTPUT TORQUE

CROSS-REFERENCE TO RELATED APPLICATIONS

This application claims priority to German Patent Application No. 10 2004 041 660.5, which was filed on Aug. 27, 2004, and is incorporated herein by reference in its entirety.

TECHNICAL FIELD

The invention relates to a method and a device for determining an output torque.

BACKGROUND

Electronic gas pedal indicators are utilized for the purposes of determining a torque required by the driver. In contrast to mechanical gas pedals, which are connected direct to the throttle valve via a Bowden cable in the case of gasoline-operated combustion engines for example, electronic gas pedal indicators just emit an electrical signal which expresses the torque requirement of the driver. A torque structure contains the information from the electronic gas pedal indicator, from an idling regulator, and various other consumer units located in the motor vehicle. The required torque is calculated from this collected information. This calculated torque is set with the aid of the various actuators of the combustion engine (e.g. electrically operated throttle valve). Due to the electronic acceleration system, there is no direct connection between the driver and the combustion engine. As will be explained in detail later, there is a possibility of pedal play being present at low speeds, in particular around the idling speed. By this is meant that a driver of a combustion engine moves the electronic gas pedal over a certain range without obtaining a response from the combustion engine. This occurs chiefly when the combustion engine is in the idling condition. The idling regulator of the combustion engine demands a minimum torque of approx. 40 Nm for example, to keep the combustion engine in a stabile operating state at the lowest possible speed. If the pedal indicator of the electronic acceleration system is located at its initial position—that is to say 0%, the driver does not require any torque from the combustion engine. If the driver moves the pedal indicator, the combustion engine does not respond until the torque set by the driver lies above the torque required by the idling regulator. To this effect, the driver has to deflect the pedal indicator by approx. 6% from an initial position, i.e. the driver feels no response from the combustion engine between 0% and 6% of the pedal position.

SUMMARY

The object underlying the invention is to put forward a method and a device for the purposes of determining an output torque so that the pedal indicator or the gas pedal has no play over the entire range of speed of the combustion engine.

The object can be achieved by a method for determining an output torque in order to prevent pedal play in a gas pedal assigned to a combustion engine, comprising the steps of:

calculating a second torque for a stable idling speed corresponding in particular to the operating state of the combustion engine, measuring the current speed of the combustion engine, forming a difference from a further speed and the idling speed, which forms the denominator of the quotient, wherein the multiplication of the quotient by the second torque produces a first torque.

The further speed can correspond to an activation speed, where the second torque is only calculated when the current speed is less than or equal to the activation speed. The activation speed may lie between 500 rpm and 1500 rpm. The second torque can be calculated by an idling regulator of the combustion engine. The first torque can be equal to zero when the current speed is greater than the activation speed. The first torque can be equal to zero at the maximum pedal position. A torque assigned to a pedal position can be added to the first torque. The second torque can be dependent on at least one consumer unit connected to the combustion engine.

The object can also be achieved by a device for determining an output torque comprising a speed sensor for measuring the current speed of a combustion engine, an idling regulator for calculating a second torque, to which the speed sensor is connected, and a correction unit for calculating a first torque, to which the output of the idling regulator is connected, and for forming a first difference from a further speed and the current speed, and a second difference from the further speed and an idling speed dependent on the second torque, wherein the correction unit calculates a quotient from the first and second differentials, and wherein the multiplication of the quotient by the second torque is provided at the output of the correction unit.

The device may display a pedal position indicator, a pedal position unit with a set of characteristics, and an adder unit, where the pedal position indicator is connected to the input of the pedal position unit and the outputs of the pedal position unit and the correction unit are connected to the corresponding inputs of the adder unit.

The invention is characterized by a method or device for determining an output torque in order to prevent pedal play in a gas pedal assigned to a combustion engine. In this respect, a second torque is calculated for a stable idling speed corresponding in particular to the operating state of the combustion engine. This can be carried out by an idling regulator for example. The current speed of the combustion engine can be measured by using a speed sensor for example. The differential is formed from a further speed and the current speed, which forms the numerator of a quotient. Alongside this, the differential is formed from the further speed and the idling speed, which forms the denominator of the quotient. This quotient is multiplied by the second torque and produces a first torque. Such a calculation is effected in a correction unit for example.

This method according to the invention and device according to the invention have the advantage of giving the driver the impression that the combustion engine immediately follows the gas pedal movements and responds over this entire idling range of the combustion engine. By using this invention, the engine is dependent on the acceleration.

An advantageous embodiment of the invention comprises only carrying out the calculation of the second torque when the current speed lies below the further speed or activation speed. Above this activation speed, the first torque can be set equal to 0. This has the advantage that the correction calculations are terminated above the activation speed. This prevents the engine control system being burdened with additional calculation functions in higher speed ranges.

BRIEF DESCRIPTION OF THE DRAWINGS

The invention is explained below by way of example with reference to the schematic drawing, in which.

DETAILED DESCRIPTION

Figure 1A:
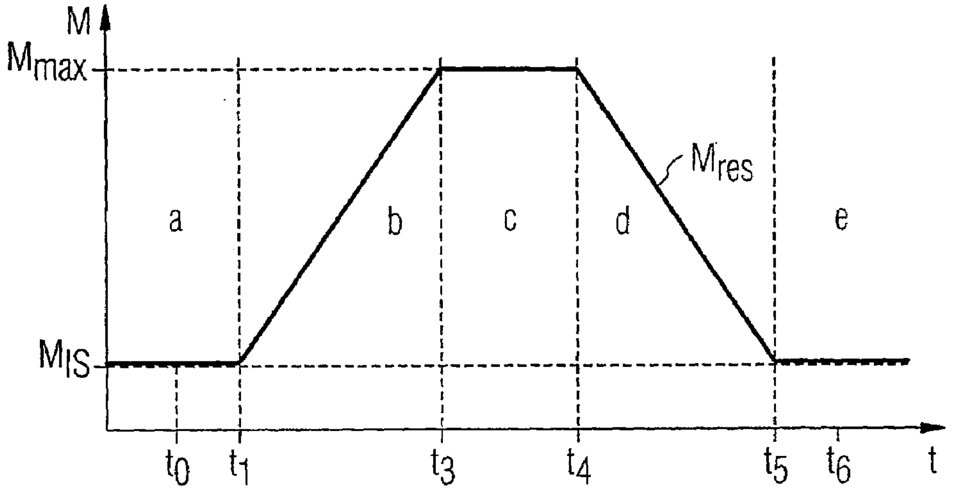
FIG 1A (PRIOR ART)
FIGS. 1A, 1C show the corresponding torque profiles with and without correction according to the state of the art.
Figure 1B:
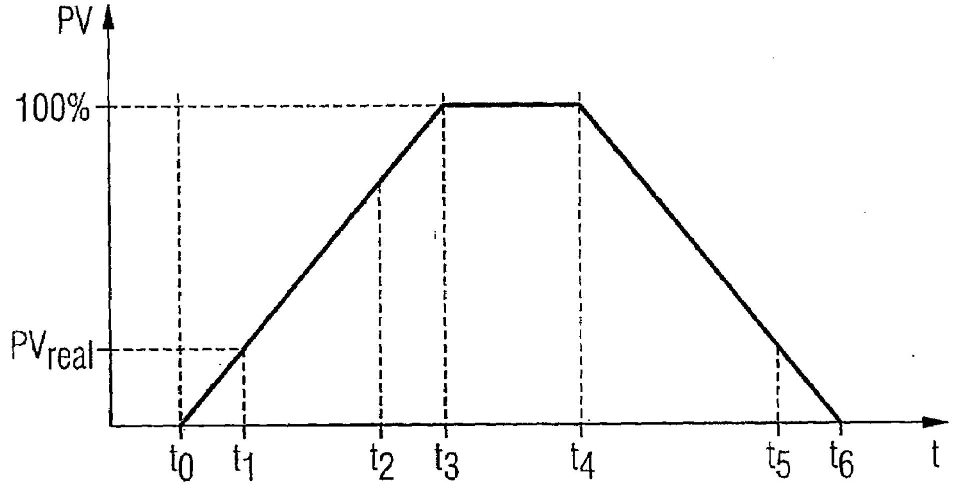
FIG. 1B shows a time profile for a pedal indicator.
Figure 1C:
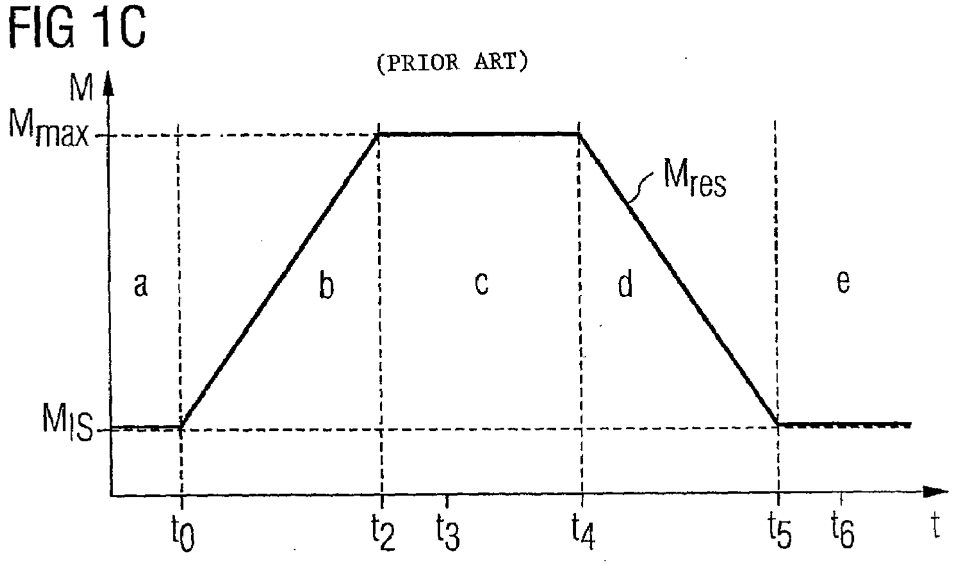
FIG 1C (PRIOR ART)

FIGS. 1A to 1C display the same time axis and time graduation. In FIG. 1B, the time profile for a pedal position is marked in. At the time $t_0$, the pedal is pressed in a linear manner up to the time $t_3$. Between the times $t_3$ and $t_4$, the pedal is fully pressed down. From the time $t_4$, the gas pedal is retracted in a linear manner to its starting position until the time $t_6$. This would correspond to full acceleration, driving in the full acceleration zone between $t_3$ and $t_4$, and then taking the foot off the gas pedal between $t_4$ and $t_6$. In the case of acceleration without correction, the resulting torque shown in FIG. 1*a* is produced. The combustion engine is in the idling condition in the zone a. Although the gas pedal is already operated at the time $t_0$, the combustion engine only responds to the movement of the pedal indicator at the time $t_1$. Between the times $t_0$ and $t_1$, therefore, pedal play of $PV_{reac}$ is produced. 6% of the full deflection is customary for pedal play. In FIG. 1*b*, as much as 24% pedal play is marked in. The maximum torque available from the combustion engine $M_{max}$ is reached at the time $t_3$. The maximum torque $M_{max}$ is output by the combustion engine up to the time $t_4$. Following this, the torque falls off in a linear manner down to the idling torque $M_{IS}$ at the time $t_5$. Following this, the combustion engine delivers the idling torque $M_{IS}$. The zones a and e specify zones of idling. The zones b and d indicate zones of partial loading. And the zone c indicates the zone of full loading of the combustion engine. As can be seen, the torque output $M_{res}$ only follows the pedal movement within the time zone defined by $t_1$ and $t_5$. As soon as the driver demands a smaller torque than the idling torque $M_{IS}$ from the combustion engine, the driver feels no response from the combustion engine.

FIG. 1C illustrates the time profile for a corrected torque according to the state of the art which corresponds to the time profile for the pedal illustrated in FIG. 1B. The output torque $M_{RIS}$ is in the idling condition $M_{IS}$ up to the time $t_0$. As soon as the pedal is displaced at the time $t_0$, the torque illustrated in FIG. 1C increases but reaches the maximum torque $M_{max}$ as early as the time $t_2$, although the gas pedal has not yet reached the full deflection of 100%. Between the times $t_2$ and $t_4$, the combustion engine delivers the maximum torque $M_{max}$. Between the times $t_2$ and $t_3$, the driver similarly feels no response. The pedal play is therefore shifted into the upper speed range. After reaching the full deflection, the engine control system can set this full deflection equal to the maximum torque $M_{max}$ so that, as can be seen in the zones defined by $t_4$ and $t_5$, the output torque follows the pedal movement. As soon as the gas pedal reaches its starting position, the torque required by the driver is added to the idling torque $M_{IS}$ as at $t_0$. Thus, the pedal play is displaced into the higher or into the lower idling zones depending on the driving circumstances.

Figure 2:
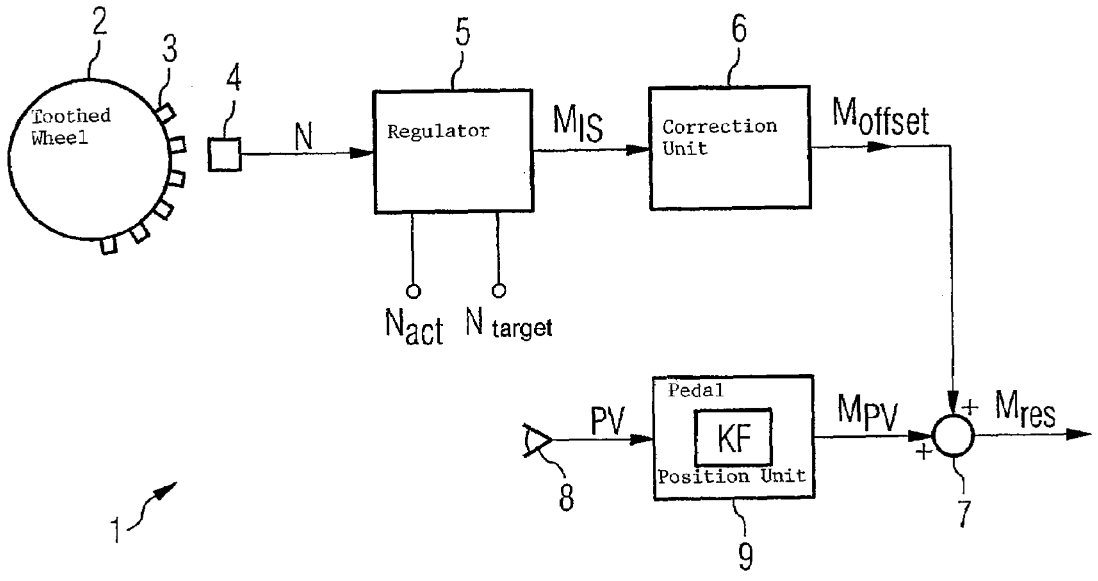

FIG. 2 illustrates a schematic circuit diagram of a device according to the invention. The device 1 comprises a toothed wheel 2 mounted on the crank shaft of the combustion engine with indicator teeth 3, a speed sensor 4, an idling regulator 5, a correction unit 6, an adder unit 7, a pedal position indicator 8 and a pedal position unit 9 with a set of characteristics KF. The speed sensor 4 counts the indicator teeth 3 running past it and therefore measures the current speed N. The output of the speed sensor 4 is connected to the input of the idling regulator 5. The idling regulator 5 is activated as soon as the current speed N is less than or equal to an activation speed $N_{act}$. As the target value, the idling regulator 5 is given the idling speed $N_{target}$. With this information, the idling regulator 5 calculates the required idling torque $M_{IS}$. The output of the idling regulator is connected to the input of the correction unit 6. The correction unit 6 calculates the first torque or the correction torque $M_{offset}$.

In the calculation, the differential from the activation speed $N_{act}$ and the current speed N is formed first, which forms the numerator of a quotient. Then the differential of the activation speed $N_{act}$ from the idling speed $N_{target}$ is formed, which represents the numerator of the above-mentioned quotient. This quotient is multiplied by the second torque or idling torque. In this respect, the correction torque $M_{offset}$ is equal to 0 when the current speed is above the activation speed $N_{act}$. The output of the correction unit 6 is connected to a first input of the adder unit 7.

The output of the pedal position indicator 8 is connected to the input of the pedal position unit 9. The torque required by the driver $M_{PV}$ is output from the set of characteristics KF. The output of the pedal position unit 9 is connected to the second input of the adder unit 7. The two torques $M_{offset}$ and $M_{PV}$ are added in the adder unit 7 and produce the output torque $M_{res}$.

Figure 3A:
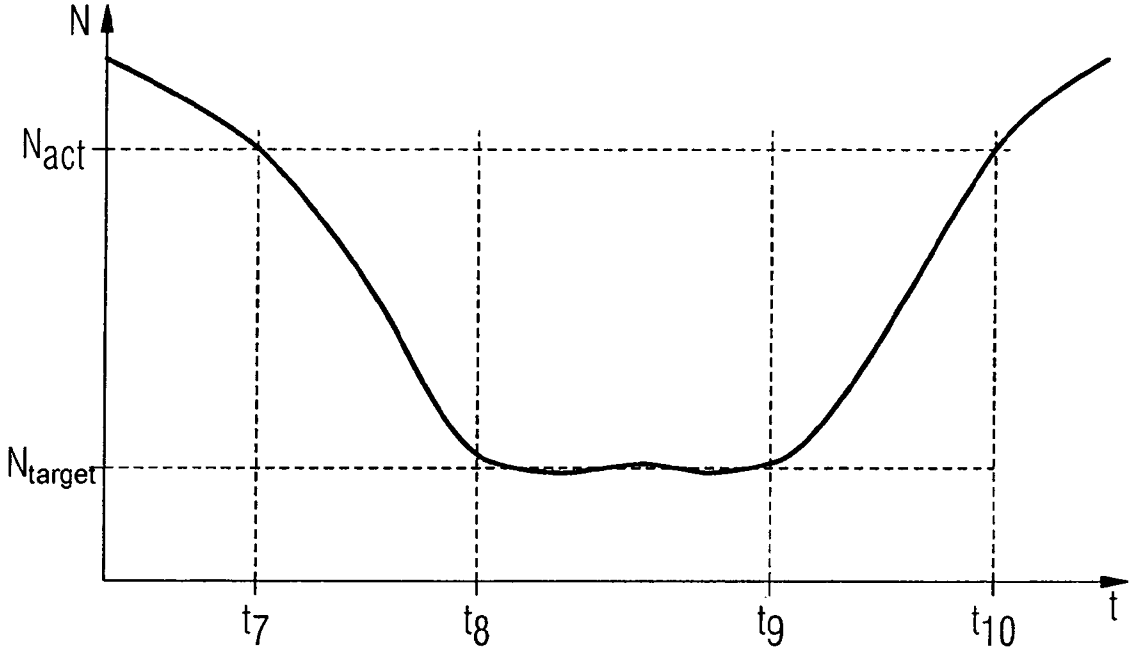
FIG. 3A shows a time profile for the speed.
Figure 3B:
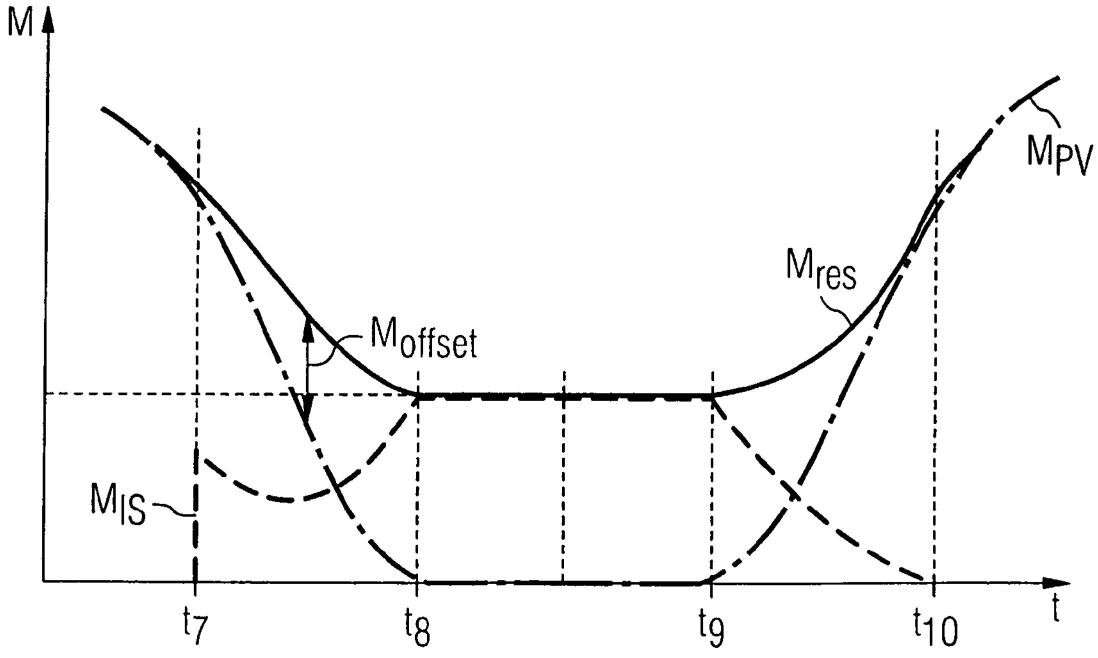
FIG. 3B shows the time profile for the torque as defined by the invention.

The method according to the invention is explained with the aid of FIGS. 3*a* and *b*. In this respect, FIG. 3*a* shows the change in the speed as a function of time. FIG. 3*b* shows the change in the torque as a function of time, where the time axes in FIGS. 3*a* and *b* are identical. FIG. 3*a* shows a trough-like curve, where the current speed of the combustion engine falls below the activation speed $N_{act}$ as from the time $t_7$. The current speed N remains below this activation speed $N_{act}$ up to the time $t_{10}$. At the time $t_8$, the combustion engine reaches the idling speed $N_{target}$ and remains at this idling speed $N_{target}$ up to the time $t_9$. The current speed increases as from the time $t_9$, where the current speed is greater than the activation speed $N_{act}$ as from the time $t_{10}$.

In FIG. 3*b*, three torque curves are drawn in. The dash-line curve represents the idling torque $M_{IS}$. The dot-and-dash curve represents the torque required by the driver $M_{PV}$. The solid curve reproduces the output torque $M_{res}$. As can be seen from FIG. 3*b*, the solid and the dot-and-dash lines overlap prior to the time $t_7$ and after the time $t_{10}$. Between the times $t_7$ and $t_{10}$, the idling regulator 5 is active and outputs a corresponding idling torque $M_{IS}$. Outside of this time zone defined by $t_7$ and $t_{10}$, the idling regulator 5 is inactive. From the time $t_7$, the idling regulator 5 starts up abruptly. In this respect, the gas pedal is retracted to its starting position of 0% from the time $t_7$ up to the time $t_8$. It remains there up to the time $t_9$. From then onward, the gas pedal is operated again. With the aid of the set of characteristics KF stored in the pedal position unit 9, the pedal movements are converted into corresponding torque requirements of the driver $M_{PV}$ as represented by the dash-and-dot line in FIG. 3*b*. Between the times $t_7$ and $t_{10}$, the correction torque $M_{offset}$ is calculated by the correction unit 6 as described above. The addition of the correction torque $M_{offset}$ to the torque required by the driver $M_{PV}$ produces the output torque $M_{res}$; as can be seen from FIG. 3*b*, the correction torque $M_{offset}$ is equal to the idling torque $M_{is}$.

This method according to the invention and this device according to the invention ensures that no play can be detected by the driver at the pedal position indicator.

What is claimed is:

1. A method for determining an output torque in order to prevent pedal play in a gas pedal assigned to a combustion engine, comprising the steps of:

calculating a second torque for a stable idling speed corresponding in particular to the operating state of the combustion engine, measuring the current speed of the combustion engine, forming a difference from a further speed and the idling speed, which forms the denominator of the quotient, wherein the multiplication of the quotient by the second torque produces a first torque.

2. A method according to claim 1, wherein the further speed corresponds to an activation speed, where the second torque is only calculated when the current speed is less than or equal to the activation speed.

3. A method according to claim 1, wherein the activation speed lies between 500 rpm and 1500 rpm.

4. A method according to claim 1, wherein the second torque is calculated by an idling regulator of the combustion engine.

5. A method according to claim 1, wherein the first torque is equal to zero when the current speed is greater than the activation speed.

6. A method according to claim 1, wherein the first torque is equal to zero at the maximum pedal position.

7. A method according to claim 1, wherein a torque assigned to a pedal position is added to the first torque.

8. A method according to claim 1, wherein the second torque is dependent on at least one consumer unit connected to the combustion engine.

9. A device for determining an output torque comprising:

a speed sensor for measuring the current speed of a combustion engine, an idling regulator for calculating a second torque, to which the speed sensor is connected, and a correction unit for calculating a first torque, to which the output of the idling regulator is connected, and for forming a first difference from a further speed and the current speed, and a second difference from the further speed and an idling speed dependent on the second torque, wherein the correction unit calculates a quotient from the first and second differentials, and wherein the multiplication of the quotient by the second torque is provided at the output of the correction unit.

10. A device according to claim 9, wherein the device displays a pedal position indicator, a pedal position unit with a set of characteristics, and an adder unit, where the pedal position indicator is connected to the input of the pedal position unit and the outputs of the pedal position unit and the correction unit are connected to the corresponding inputs of the adder unit.

11. A device for determining an output torque comprising:

means for calculating a second torque for a stable idling speed corresponding in particular to the operating state of the combustion engine, means for measuring the current speed of the combustion engine, and means for forming a difference from a further speed and the idling speed, which forms the denominator of the quotient, wherein the multiplication of the quotient by the second torque produces a first torque.

12. A device according to claim 11, wherein the further speed corresponds to an activation speed, where the second torque is only calculated when the current speed is less than or equal to the activation speed.

13. A device according to claim 11, wherein the activation speed lies between 500 rpm and 1500 rpm.

14. Device according to claim 11, wherein the second torque is calculated by an idling regulator of the combustion engine.

15. A device according to claim 11, wherein the first torque is equal to zero when the current speed is greater than the activation speed.

16. A device according to claim 11, wherein the first torque is equal to zero at the maximum pedal position.

17. A device according to claim 11, wherein a torque assigned to a pedal position is added to the first torque.

18. A device according to claim 11, wherein the second torque is dependent on at least one consumer unit connected to the combustion engine.

* * * * *